US008391156B2

(12) United States Patent
Krzanowski et al.

(10) Patent No.: US 8,391,156 B2
(45) Date of Patent: Mar. 5, 2013

(54) TESTING AND EVALUATING THE STATUS OF A NETWORK NODE

(75) Inventors: Roman Krzanowski, White Plains, NY (US); Sanjay Kohli, Cranbury, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 1417 days.

(21) Appl. No.: 11/562,029

(22) Filed: Nov. 21, 2006

(65) Prior Publication Data

US 2008/0117825 A1 May 22, 2008

(51) Int. Cl.
*G06F 11/00* (2006.01)
(52) U.S. Cl. ........................................ 370/241
(58) Field of Classification Search ............... 370/241; 709/224, 218; 714/815
See application file for complete search history.

(56) References Cited

U.S. PATENT DOCUMENTS

| | | | | |
|---|---|---|---|---|
| 4,709,341 A * | 11/1987 | Matsuda | | 714/815 |
| 5,908,467 A * | 6/1999 | Barrett et al. | | 709/218 |
| 6,321,264 B1 * | 11/2001 | Fletcher et al. | | 709/224 |
| 6,678,250 B1 * | 1/2004 | Grabelsky et al. | | 370/241 |
| 2003/0072269 A1 * | 4/2003 | Teruhi et al. | | 370/252 |
| 2003/0115321 A1 * | 6/2003 | Edmison et al. | | 709/224 |
| 2004/0109418 A1 * | 6/2004 | Fedorkow et al. | | 370/251 |
| 2007/0110034 A1 * | 5/2007 | Bennett | | 370/352 |
| 2007/0112972 A1 * | 5/2007 | Yonge et al. | | 709/231 |
| 2007/0115833 A1 * | 5/2007 | Pepper et al. | | 370/241 |

* cited by examiner

*Primary Examiner* — Mark Rinehart
*Assistant Examiner* — Mohammad Anwar

(57) ABSTRACT

A system receives a data unit from a sending node and identifies if the data unit indicates that it is a test data unit. The system determines a delta time that includes a difference between a time at which a response data unit is going to be sent to the sending node and a time at which the data unit was received. The system inserts the delta time, if the identification indicates that the data unit is a test data unit, in the response data unit and sends the response data unit to the sending node.

19 Claims, 8 Drawing Sheets

TESTING AND EVALUATING THE STATUS OF A NETWORK NODE

BACKGROUND

Network performance tests are useful for evaluating the performance of various nodes in a network. Such performance tests typically have involved sending test packets through the network for evaluating network performance. Existing performance tests, however, have determined the status of a given node in the network by inferring from errors in the network performance tests, or from measures of the central processing unit (CPU), memory or other vital signs of the node. Such existing approaches to network performance measurement lead to confusion since the errors in the network performance tests may have been caused by many other network problems, and not necessarily by the status of a given network node.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

As described herein, an exemplary technique for testing network nodes is provided that evaluates a given network node's status based on a processing time associated with a test data unit sent to that node. When a test data unit is sent from a sending node and received at a receiving node, the receiving node identifies a time at which the test data unit is received. The receiving node further identifies a time at which a response data unit will be returned to the sending node. A time value associated with the difference between the time at which the response data unit will be returned to the sending node and the time at which the test data unit is received may be inserted into the response data unit that is sent from the receiving node to the sending node. This time value may be related to the processing time associated with the test data unit. The time value may be extracted from the response data unit at the sending node and a magnitude of the time value may be used to evaluate the status of the receiving node.

Figure 1:
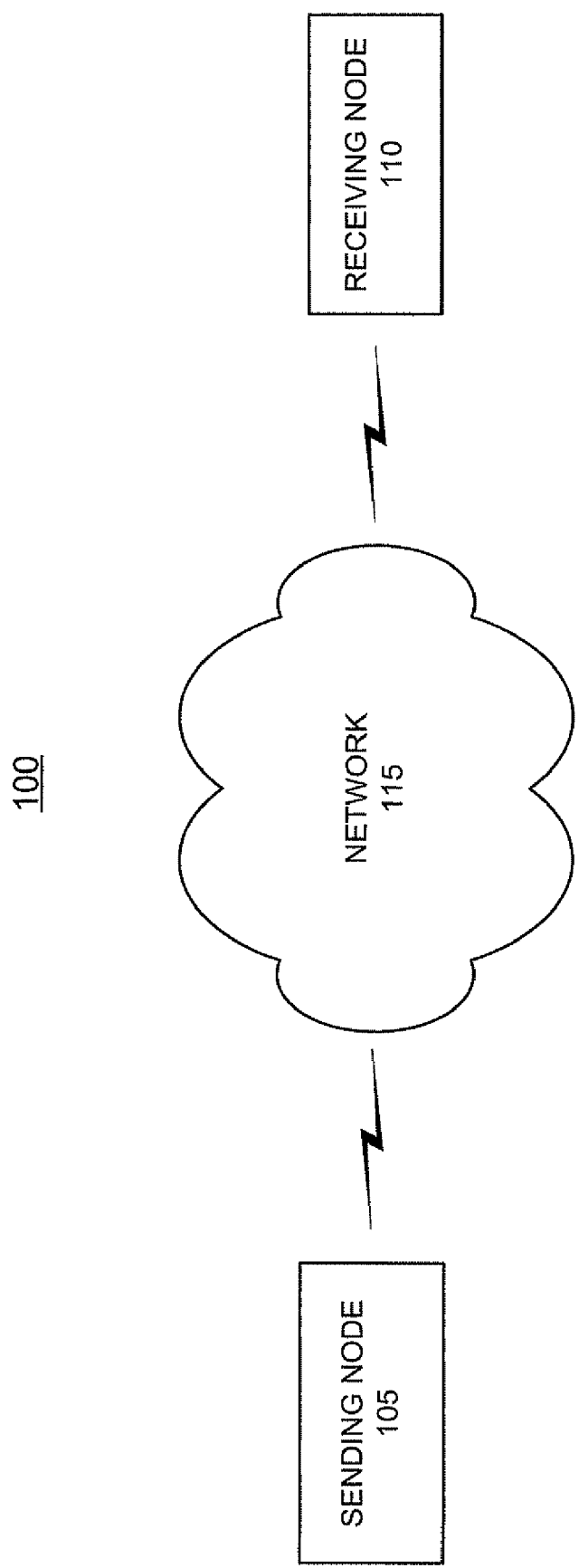
FIG. 1 is an exemplary diagram of a network in which systems and methods described herein may be implemented.

FIG. 1 is an exemplary diagram of a network 100 in which systems and methods described herein may be implemented. Network 100 may include a sending node 105 and a receiving node 110 interconnected via a network 115. A single sending node 105 and a single receiving node 110 have been illustrated as connected to network 115 for simplicity. In practice, there may be more or fewer sending and/or receiving nodes.

Sending node 105 and receiving node 110 may include any type of device that can send, receive and process data. For example, sending node 105 and/or receiving node 110 may include a personal computer, a wireless telephone, a personal digital assistant (PDA), a lap top, a router, a switch, a network interface card (NIC), a hub, a bridge, or another type of computation or communication device, a thread or process running on one of these devices, and/or an object executable by one of these devices.

Network 115 may include one or more networks of any type, including a local area network (LAN), a wide area network (WAN), a metropolitan area network (MAN), a telephone network, such as the Public Switched Telephone Network (PSTN) or a Public Land Mobile Network (PLMN), an intranet, the Internet, or a combination of networks. The PLMN(s) may further include a packet-switched sub-network, such as, for example, General Packet Radio Service (GPRS), Cellular Digital Packet Data (CDPD), or Mobile IP sub-network. Sending node 105 and receiving node 110 may connect to network 115 via wired, wireless, and/or optical connections.

Figure 2:
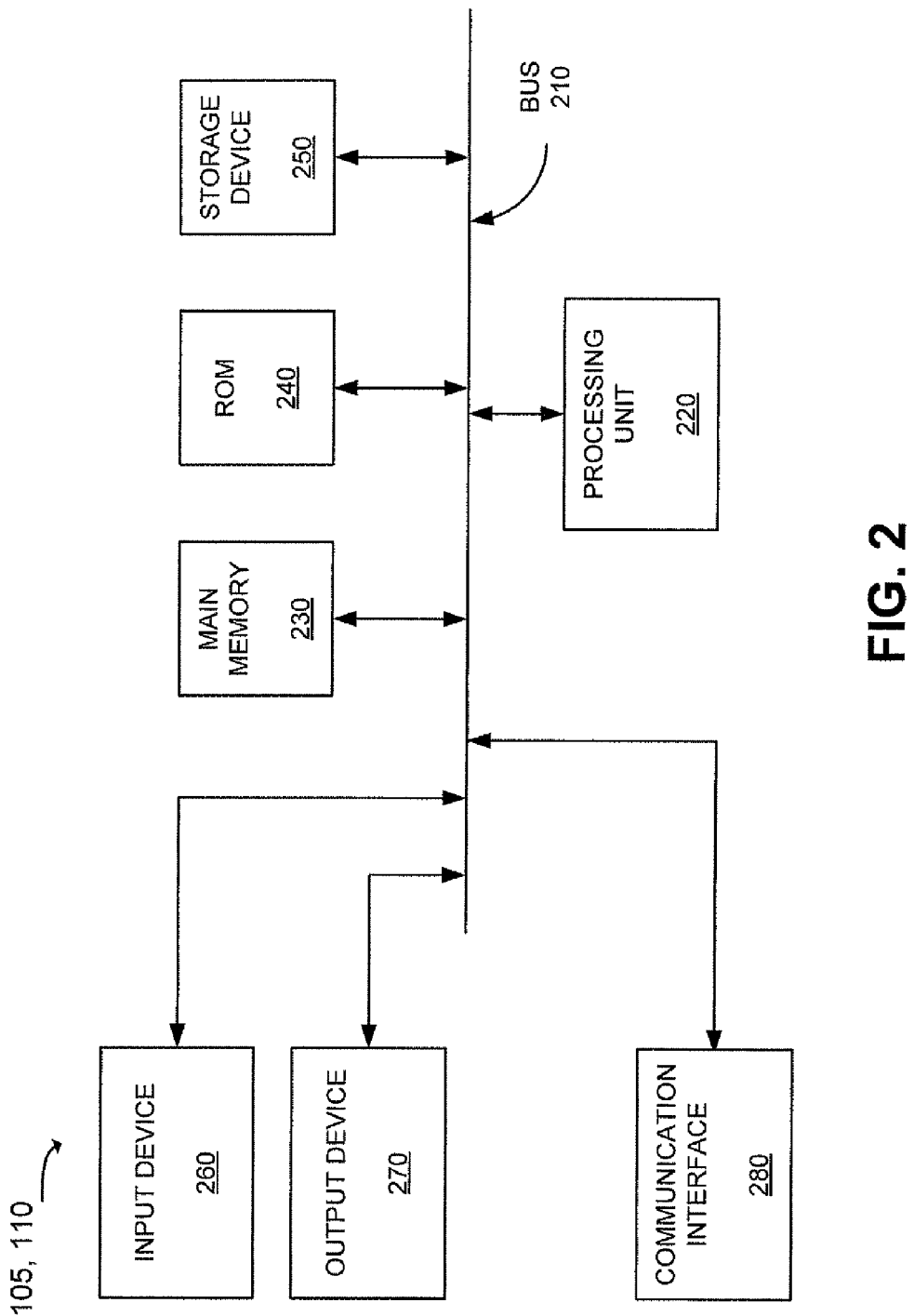
FIG. 2 is an exemplary diagram of a sending node or receiving node of FIG. 1.

FIG. 2 is a diagram of an exemplary configuration of sending node 105. Receiving node 110 may be similarly configured. Sending node 105 may include a bus 210, a processing unit 220, a main memory 230, a read only memory (ROM) 240, a storage device 250, an input device 260, an output device 270, and a communication interface 280. Bus 210 may include a path that permits communication among the elements of sending node 105.

Processing unit 220 may include a processor, microprocessor, or processing logic that may interpret and execute instructions. Main memory 230 may include a random access memory (RAM) or another type of dynamic storage device that may store information and instructions for execution by processing unit 220. ROM 240 may include a ROM device or another type of static storage device that may store static information and instructions for use by processing unit 220. Storage device 250 may include a magnetic and/or optical recording medium and its corresponding drive.

Input device 260 may include a mechanism that permits an operator to input information to sending node 105, such as a keyboard, a mouse, a pen, voice recognition and/or biometric mechanisms, etc. Output device 270 may include a mechanism that outputs information to the operator, including a display, a printer, a speaker, etc. Communication interface 280 may include any transceiver-like mechanism that enables sending node 105 to communicate with other devices and/or systems. For example, communication interface 280 may include mechanisms for communicating with another device or system via a network, such as network 115.

Sending node 105 and/or receiving node 110 may perform certain operations or processes, as will be described in detail below. Sending node 105 and/or receiving node 110 may perform these operations in response to processing unit 220 executing software instructions contained in a computer-readable medium, such as main memory 230. A computer-readable medium may be defined as a physical or logical memory device and/or carrier wave.

The software instructions may be read into main memory 230 from another computer-readable medium, such as data storage device 250, or from another device via communication interface 280. The software instructions contained main memory 230 may cause processing unit 220 to perform operations or processes that will be described later. Alternatively, hardwired circuitry may be used in place of or in combination with software instructions to implement processes described herein. Thus, implementations described herein are not limited to any specific combination of hardware circuitry and software.

Figure 3:
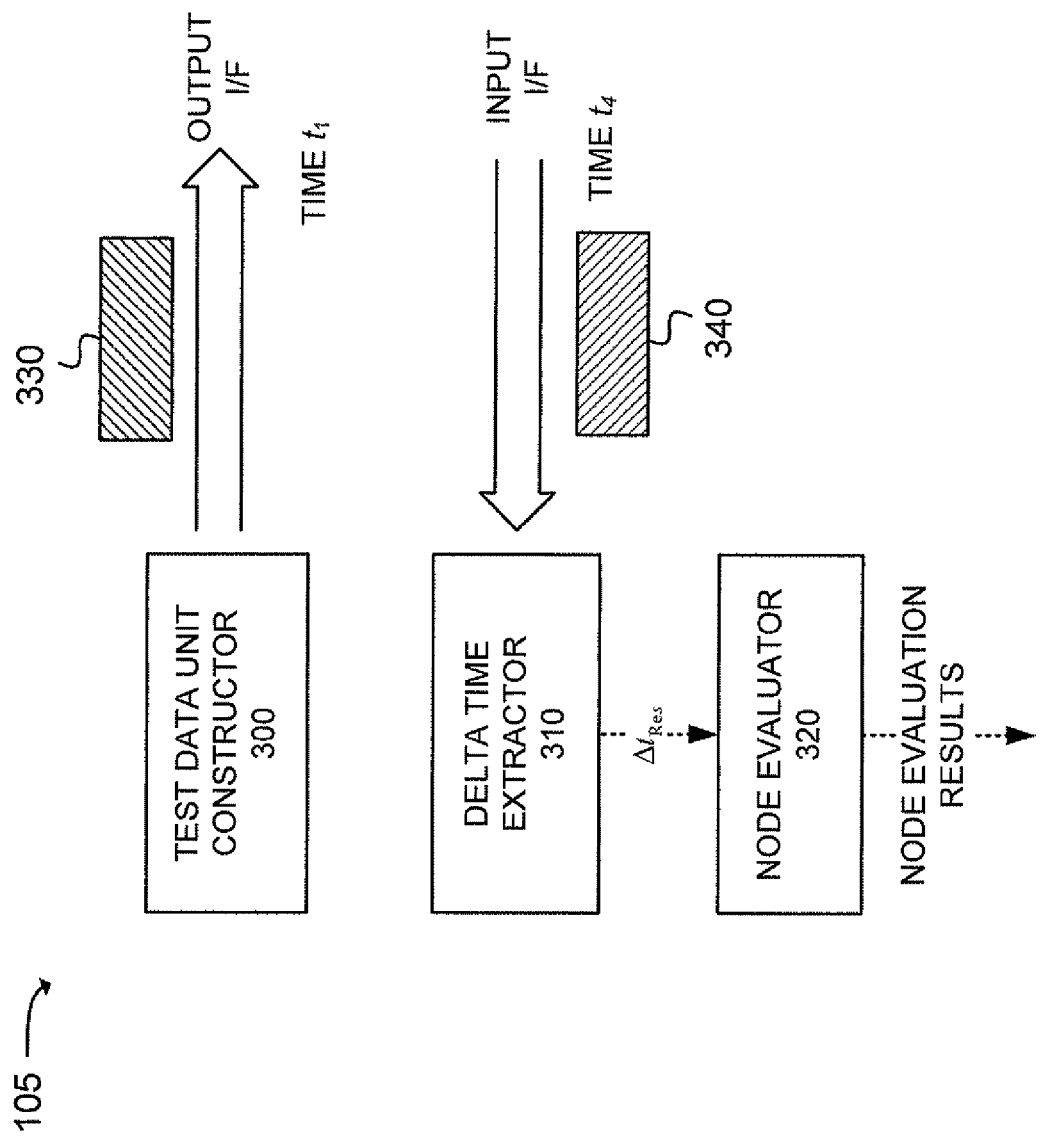
FIG. 3 is a functional block diagram of the sending node of FIG. 1.

FIG. 3 is a functional block diagram illustrating various functions performed by sending node 105 consistent with exemplary embodiments. As shown in FIG. 3, sending node 105 may include a test data unit constructor 300, a delta time extractor 310 and a node evaluator 320. Test data unit constructor 300 may construct a test data unit 330 and may send the test data unit 330 to receiving node 110 via an output interface (not shown). Delta time extractor 310 may extract a delta time ($\Delta t_{res}$) from a response data unit 340 received from receiving node 110 at an input interface (not shown) of sending node 105. As described further below, delta time $\Delta t_{res}$ may include a difference between a time at which test data unit 330 is received at receiving node 110 and a time at which receiving node 110 sends response data unit 340 to sending node 105. Node evaluator 320 may evaluate the status of receiving node 110 based on a magnitude of the delta time ($\Delta t_{res}$) extracted from response data unit 340. The magnitude of the delta time may provide some indication of a data unit processing time at receiving node 110. A larger magnitude for the delta time may indicate that receiving node 110 is busy processing other data units and, therefore, may be too busy to conduct a test session with sending node 105.

Figure 4:
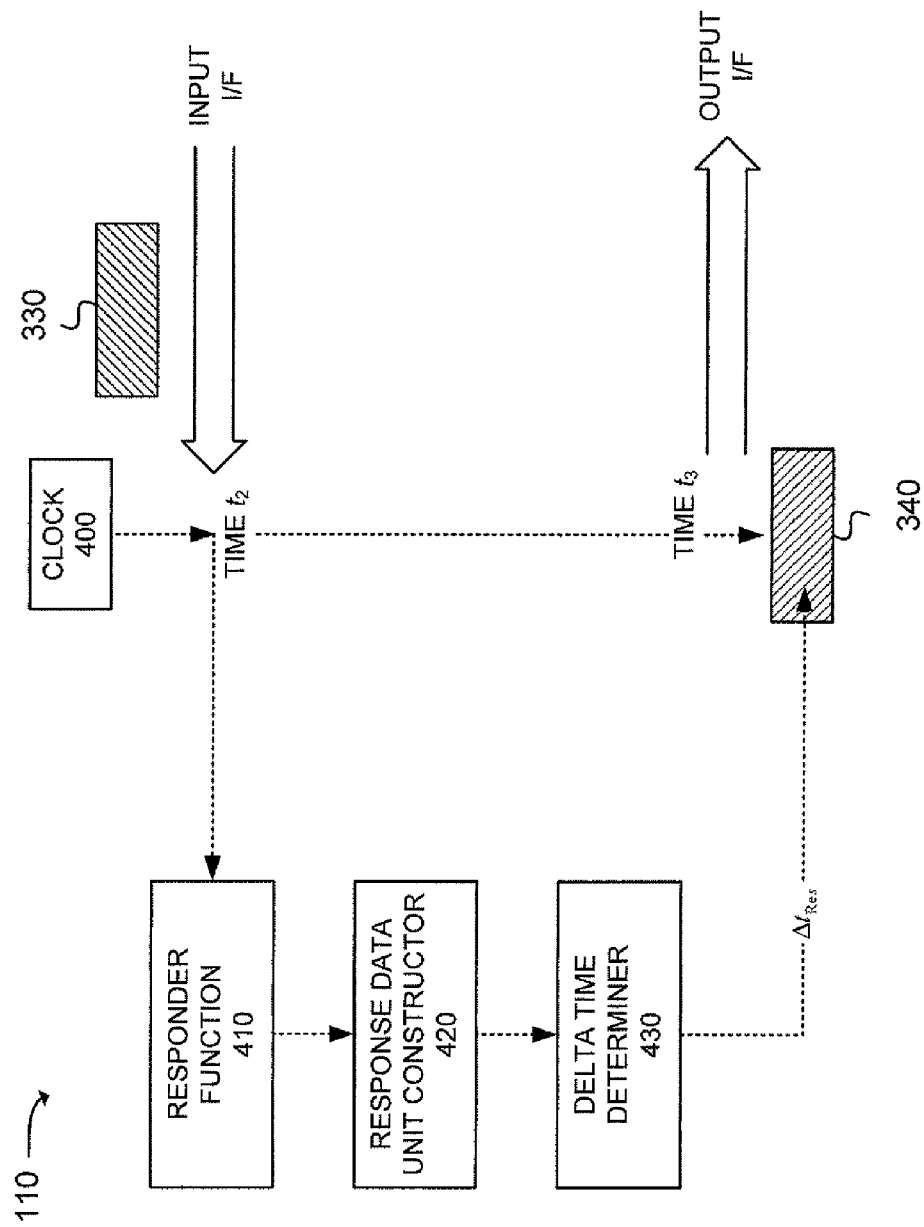
FIG. 4 is a functional block diagram of the receiving node of FIG. 1.

FIG. 4 is a functional block diagram illustrating various functions performed by receiving node 110 consistent with exemplary embodiments. As shown in FIG. 4, receiving node 110 may include a clock 400, a responder function 410, a response data unit constructor 420 and a delta time determiner 430. Clock 400 may timestamp a test data unit 330 received at receiving node 110 from sending node 105 with a time $t_2$ at which test data unit 330 is received. Based on receipt of test data unit 330, responder function 410 may be executed. Responder function 410 may include a specific set of operations to be performed by receiving node 110 upon receipt of test data unit 330. The responder function 410 may include, for example, a CPU testing function, a memory access testing function, or the like. The responder function 410 may include any type of testing function, or other type of function that may be executed at receiving node 110. Subsequent to, or during, execution of responder function 410, response data unit constructor 420 may construct response data unit 340 for returning to sending node 105. Delta time determiner 430 may determine a delta time ($\Delta t_{res}$) that includes a difference between the time $t_2$ at which test data unit 330 was received and a time $t_3$ at which response data unit 340 may be sent back to sending node 105. Delta time determiner 430 may further insert the determined delta time value into the outgoing response data unit 340 for transmission to sending node 105.

Figure 5:
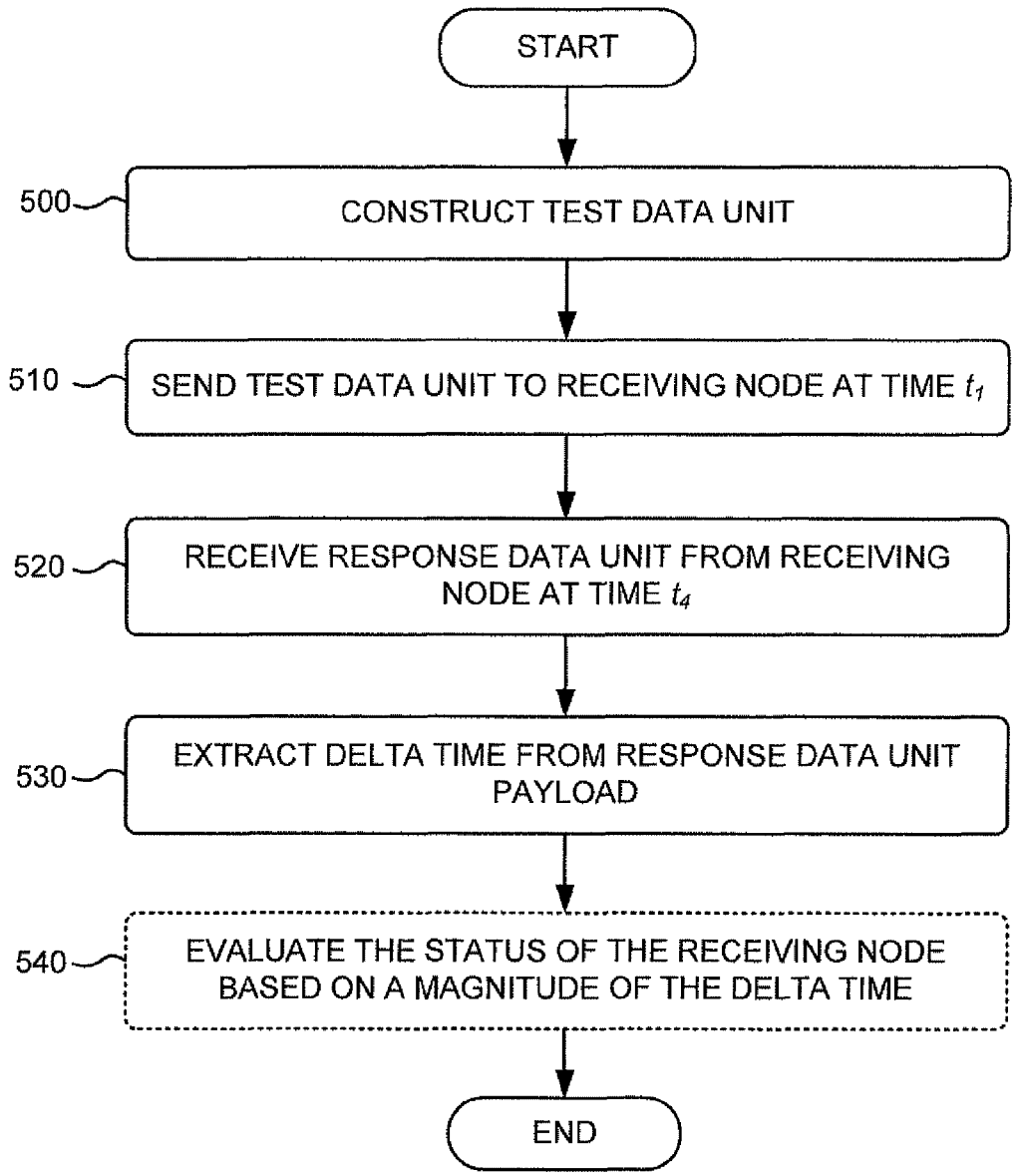
FIG. 5 is a flowchart of an exemplary process for sending a test data unit from a sending node to a receiving node and evaluating a status of the receiving node based on a response data unit returned to the sending node from the receiving node.

FIG. 5 is a flowchart of an exemplary process for sending a test data unit from sending node 105 to receiving node 110 and for evaluating the status of receiving node 110. The process exemplified by FIG. 5 may be performed by sending node 105.

The exemplary process may begin with the construction of a test data unit by test data unit constructor 300 (block 500).

Figure 6A:
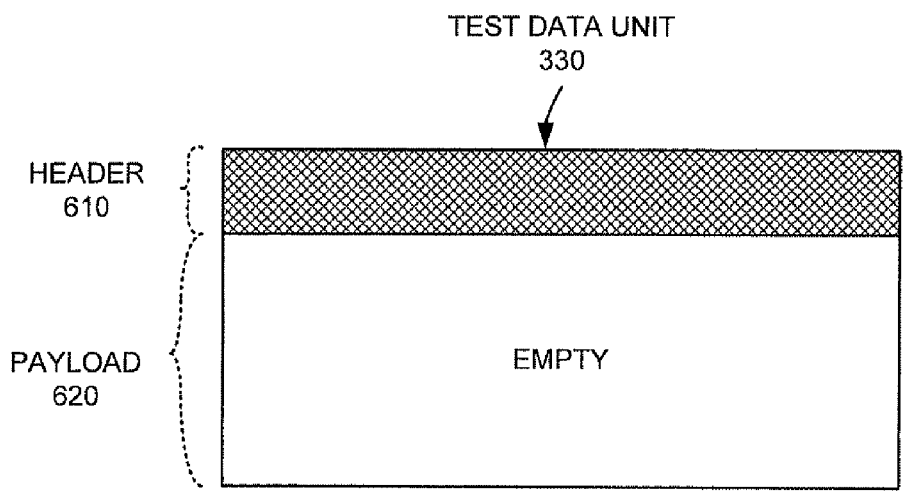
FIG. 6A illustrates an exemplary test data unit sent by a sending node of FIG. 1.

FIG. 6A illustrates an exemplary test data unit 330 according to one implementation. Test data unit 330 may include a header 610 and a payload 620. In this implementation, test data unit 330 may be designated as a test data unit by leaving payload 620 empty. An empty payload 620 minimizes test data unit 330's affect on network bandwidth and on processing resources at receiving node 110. In other implementations (not shown), test data unit 330 may include, instead of an empty payload 620, an identifier field in header 610 that identifies data unit 330 as a test data unit. Header 610 may include data unit overhead information, such as, for example, a network address associated with the sending node and the destination node (e.g., network addresses of sending node 105 and receiving node 110). The structure of test data unit 330 shown in FIG. 6A is for illustrative purposes only. Other data unit structures may be used, based on the type of protocol used for testing.

Test data unit 330 may be sent by sending node 105 at various times For example, in one implementation, test data unit 330 may be sent by sending node 105 before the start of a network performance test to verify whether receiving node 110 is ready for the test session. In another implementation, test data unit 330 may be sent by sending node 105 after a test session to verify whether receiving node 110 is in a proper status to validate or invalidate the results of a previous test session. In still another implementation, test data unit 330 may also be sent by sending node 105 in between data units of a test session that performs other testing, and the results can be collected by sending node 105. The results may be used by sending node 105 to evaluate the status of receiving node 110 during the test session, and to validate or invalidate the results of the test session. Receiving node 110 may distinguish test data unit 330 from other test session data units by test data unit 330's empty payload 620. Any combination of the above may be used for evaluating a status of receiving node 110 before, during and/or after a test session.

Figure 7:
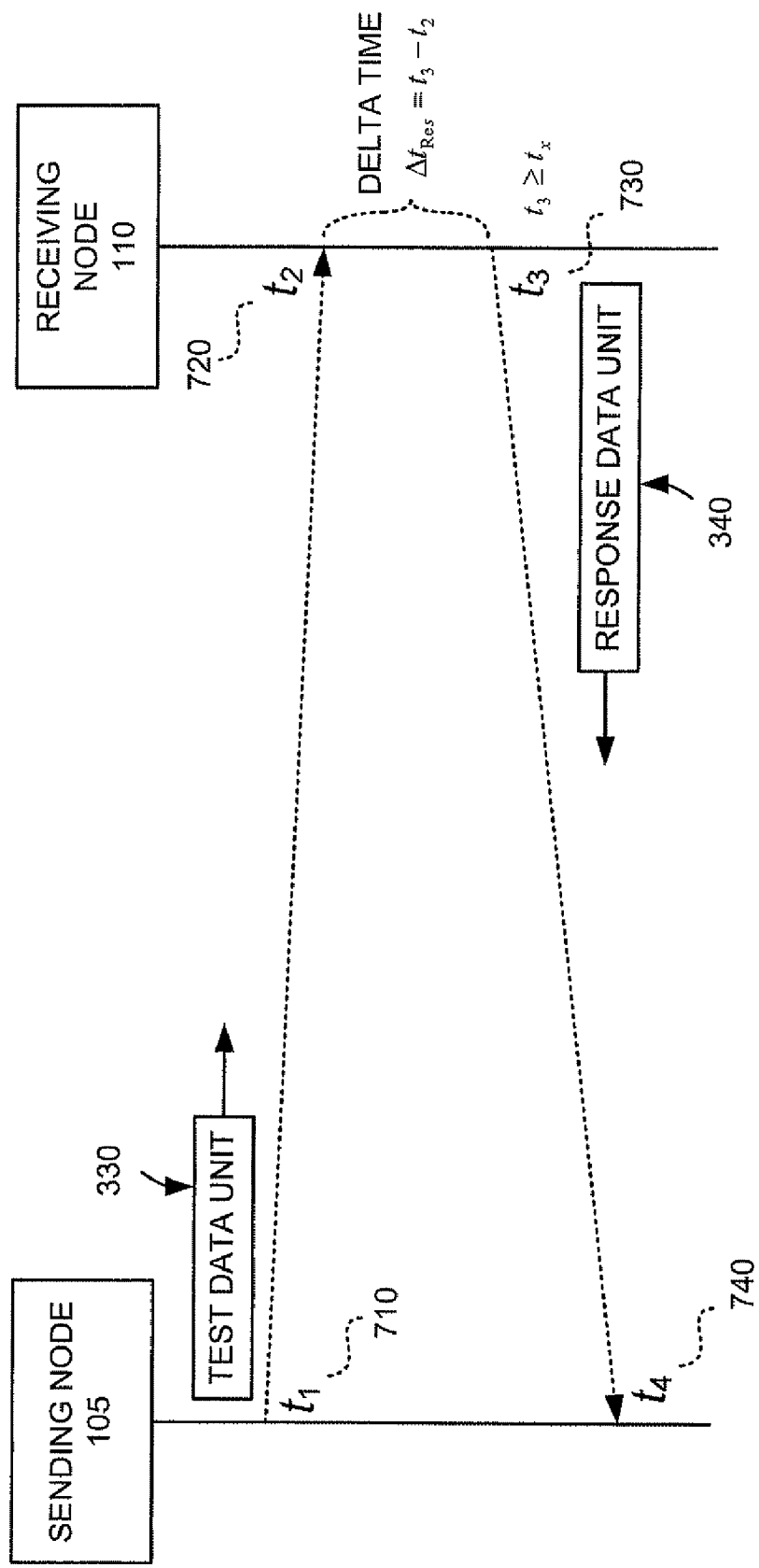
FIG. 7 is an exemplary messaging diagram illustrating the sending of a test data unit from a sending node to a receiving node, and the return of a response data unit from the receiving node to the sending node.

Returning to FIG. 5, sending node 105 may send the constructed test data unit to receiving node 110 at a time $t_1$ (block 510). As depicted in the messaging diagram of FIG. 7, sending node 105 sends test data unit 330 to receiving node 110 at time $t_1$ 710.

Figure 6B:
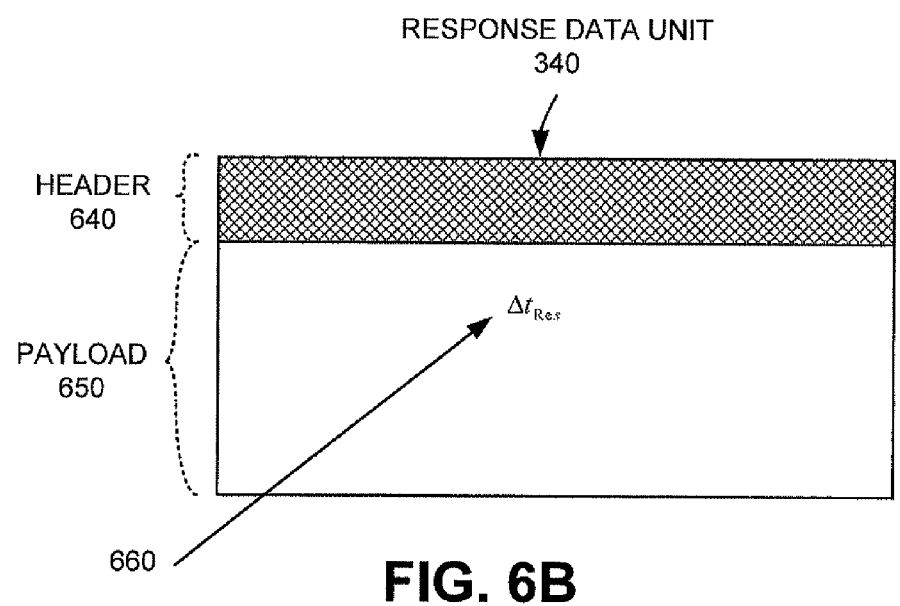
FIG. 6B illustrates an exemplary response data unit sent by a receiving node of FIG. 1.

Sending node 105 may receive a response data unit from receiving node 110 at a time $t_4$ (block 520). FIG. 6B illustrates an exemplary response data unit 340 according to one implementation. Response data unit 340 may include a header 640 and a payload 650. A delta time value ($\Delta t_{res}$) 660 may be inserted within payload 650 by receiving node 110. The delta time value ($\Delta t_{res}$) is described further below in connection with FIG. 8. Header 640 may include data unit overhead information, such as, for example, a network addresses associated with the sending node and the destination node (e.g., network addresses of sending node 105 and receiving node 110, respectively). As shown in the messaging diagram of FIG. 7, receiving node 110 sends response data unit 340 at a time $t_3$ 730. Sending node 105 receives response data unit 340 at time $t_4$ 740.

As further shown in FIG. 5, delta time extractor 310 of sending node 105 may extract the delta time value ($\Delta t_{res}$) 660 from payload 650 of the received response data unit 340 (block 530). Node evaluator 320 of sending node 105 may then evaluate the status of receiving node 110 based on a magnitude of the delta time value ($\Delta t_{res}$) (optional block 540). As described below with respect to FIG. 8, the magnitude of the delta time may provide some indication of a data unit processing time at receiving node 110. A larger magnitude for the delta time may indicate that receiving node 110 is busy processing other data units and, therefore, may be too busy to conduct a test session with sending node 105. Based on an evaluation of the status of receiving node 110, sending node 105 may take appropriate actions, such as, for example, terminating the testing session, sending an alarm, or sending another test data unit to receiving node 110.

Figure 8:
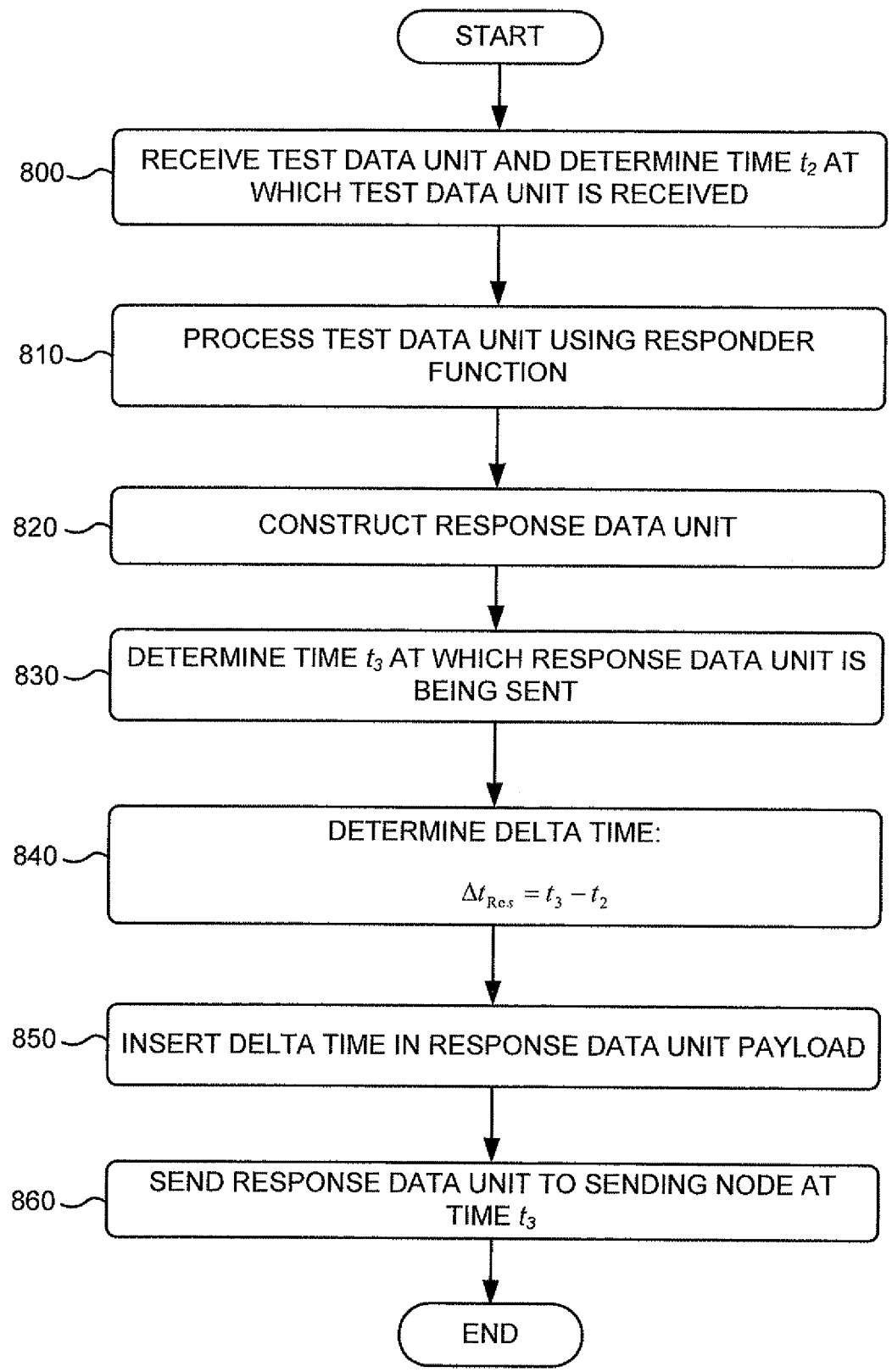
FIG. 8 is a flowchart of an exemplary process for sending a response data unit from a receiving node in response to the receipt of a test data unit from a sending node.

FIG. 8 is a flowchart of an exemplary process for receiving a test data unit at receiving node 110 and, in response, returning a response data unit to sending node 105. Sending node 105 may, in some implementations, then use the response data unit for evaluating the status of receiving node 110 (see exemplary process of FIG. 5 above). The process exemplified by FIG. 8 may be performed by receiving node 110.

The exemplary process may begin with the receipt of test data unit 330 at receiving node 110 from sending node 105, and determining a time $t_2$ at which test data unit 330 is received (block 800). Receiving node 110 may receive test data unit 330 from sending node 105 via network 115 and may time stamp, e.g., using clock 400, the received test data unit 330. As graphically shown in the messaging diagram of FIG. 7, receiving node 110 receives test data unit 330 from sending node 105 at time $t_2$ 720. Test data unit 330 may be identified as a test data unit via a specific type of field in header 610 of test data unit 330 indicating that test data unit 330 is a test data unit, or by a determination that payload 620 of test data unit 330 is empty, providing an implicit indication that test data unit 330 is a test data unit.

Receiving node 110 may then process the received test data unit 330 using an appropriate responder function 410 (block 810). The responder function 410 may include a specific set of operations to be performed by receiving node 110 upon receipt of test data unit 330. The responder function 410 may include, for example, a CPU testing function, a memory access testing function, or the like. The responder function 410 may include any type of testing function, or other type of function that may be executed at receiving node 110. In one implementation, test data unit 330 may indicate the appropriate responder function to be executed at receiving node 110. In another implementation, test data unit 330 may automatically cause the execution of a given responder function when test data unit 330 is received. Execution of the responder function may include a time period $t_x$ and receiving node 110 may not send response data unit 340 until completion of the time period $t_x$.

Response data unit constructor 420 of receiving node 110 may construct response data unit 340 (block 820). As shown in FIG. 6B, and described above, response data unit 340 may include header 640 and payload 650. Receiving node 110 may insert the appropriate information (e.g., network addresses of sending node 105 and receiving node 110) in header 640 for sending response data unit 340 to sending node 105.

Receiving node 110 may determine time $t_3$ at which response data unit 340 will be sent (block 830). The determined time $t_3$ may be based on the responder function execution time $t_x$ and, possibly, other factors (e.g., output queuing capacity). Delta time determiner 430 of receiving node 110 may determine delta time 660: $\Delta t_{res} = t_3 - t_2$ (block 840). The delta time $\Delta t_{res}$, therefore, may include the difference between time $t_2$ at which test data unit 330 was received at receiving node 110 and time $t_3$ at which receiving node 110 will send response data unit 340 to sending node 105. A component of delta time ($\Delta t_{res}$) 660 may, thus, include the responder function execution time $t_x$. Receiving node 110 may insert delta time value ($\Delta t_{res}$) 660 in payload 650 of the constructed response data unit 340 (block 850). Alternatively, the time $t_2$ 720 that receiving node 110 received test data unit 330 from sending node 105, and the time $t_3$ 730 at which response data unit 340 will be sent from receiving node 110 may both be inserted in payload 650 of response data unit 340, instead of the delta time value $\Delta t_{res}$.

Receiving node 110 may send response data unit 340 to sending node 105 at time $t_3$ (block 860). As shown in the messaging diagram of FIG. 7, receiving node 110 sends response data unit 340 at time $t_3$ 730 for receipt by sending node 105 at time $t_4$ 740. As described above with respect to FIG. 5, sending node 105 may use delta time value ($\Delta t_{res}$) 660 inserted in response data unit 340 for evaluating a status of receiving node 110.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. Modifications and variations are possible in light of the specification, or may be acquired from practice of the invention. For example, while a series of acts has been described with regard to FIGS. 3 and 6, the order of the acts may be modified in other implementations consistent with the principles of the invention. Further, non-dependent acts may be performed in parallel.

It will be apparent that embodiments, as described above, may be implemented in many different forms of software, firmware, and hardware in the implementations illustrated in the figures. The actual software code or specialized control hardware used to implement embodiments is not limiting of the invention. Thus, the operation and behavior of the embodiments have been described without reference to the specific software code, it being understood that software and control hardware may be designed based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:
1. A method comprising:
sending, by a device, a test data unit to a receiving node across a network;
receiving, by the device, a response data unit from the receiving node across the network based on sending the test data unit,
the response data unit including at least one time value that indicates an amount of time that elapsed from a first time at which the test data unit was received at the receiving node until a second time at which the receiving node sent the response data unit across the network;
extracting, by the device, the at least one time value from the response data unit; and
evaluating, by the device, a status of the receiving node based on the at least one extracted time value,
evaluating the status of the receiving node including:
conducting, by the device, a testing session with the receiving node when the at least one extracted time value corresponds to a first magnitude; and terminating, by the device, the testing session with the receiving node when the at least one extracted time value corresponds to a second magnitude different than the first magnitude.

2. The method of claim 1, where the at least one time value is associated with a period of time during which the test data unit is processed at the receiving node, and where the second time, at which the receiving node sent the response data unit across the network, corresponds to an ending of the period of time during which the test data unit is processed at the receiving node.

3. The method of claim 1, further comprising:
conducting the test session;
sending a second test data unit, different than the test data unit, to the receiving node based on the at least one time value after conducting the test session;
receiving a second response data unit, different than the response data unit, from the receiving node based on sending the second test data unit,
    where the second response data unit includes a second time value, different than the at least one time value, that indicates an amount of time that elapsed from a third time at which the second test data unit was received at the receiving node until a fourth time at which the receiving node sent the second response data unit;
determining that a result of a previous test session is valid when the second time value corresponds to a third magnitude; and
determining that the result of the previous test session is invalid when the second time value corresponds to a fourth magnitude.

4. The method of claim 1, where the test data unit comprises a header and an empty payload.

5. The method of claim 1, further comprising:
generating an alarm when the at least one time value corresponds to the second magnitude.

6. The method of claim 1, where the second magnitude is greater than the first magnitude.

7. A method comprising:
receiving, by a device, a data unit from a sending node;
determining, by the device, that the data unit is a test data unit;
determining, by the device and based on an amount of time for executing a function based on receiving the data unit, a time for sending, based on receiving the data unit, a response data unit to the sending node;
determining, by the device, a time value that corresponds to a difference between the determined time, for sending the response data unit to the sending node, and a time at which the data unit was received;
inserting, by the device, the determined time value in the response data unit based on determining that the data unit is a test data unit;
executing, by the device and based on receiving the data unit, the function; and
sending, by the device, the response data unit, with the inserted time value, to the sending node after executing the function and at the determined time for sending the response data unit;
    a magnitude of the inserted time value enabling the sending node to evaluate a status the device and determine whether to conduct a test session with the device.

8. The method of claim 7, further comprising:
processing the data unit by executing the function over a time period, where the determined time for sending the response data unit is determined based on the time period.

9. The method of claim 7, further comprising:
constructing the response data unit prior to determining the time for sending the response data unit,
where the constructed response data unit comprises a header and a payload, and
where the time value is inserted in the payload of the constructed response data unit.

10. The method of claim 7, where determining that the data unit is a test data unit comprises:
determining whether a payload of the data unit is empty; and
identifying the data unit as a test data unit based on determining that the payload is empty.

11. The method of claim 7, where determining that the data unit is a test data unit comprises:
determining that an identifier field, that identifies the data unit as a test data unit, is included in a header of the data unit; and
determining that the data unit is a test data unit when the identifier field identifies the data unit as a test data unit.

12. A node comprising:
an interface to receive, through a network, a data unit from a sending node;
a processing unit to:
    receive the data unit from the interface,
    determine a time to send, based on receiving the received data unit, a response data unit to the sending node, the time being determined based on a time period for processing the data unit,
    process, over the time period, the received data unit based on receiving the received data unit,
    insert, in a payload of the response data unit, a first time value corresponding to a time when the received data unit was received, and
    insert, in the payload of the response data unit, a second time value, different than the first time value, corresponding to the determined time to send the response data unit to the sending node,
the interface further to send the response data unit to the sending node at the determined time, and
a magnitude of a difference, between the first time value and the second time value, enabling the sending node to evaluate a status of the node and to determine whether to conduct a test session with the node.

13. The node of claim 12, where, when inserting the second time value in the response data unit, the processing unit is to:
determine whether the received data unit is a test data unit; and
insert the second time value in the response data unit when the received data unit is a test data unit.

14. The node of claim 13, where the processing unit is further to:
determine that the received data unit is a test data unit when a payload of the received data unit is empty.

15. The node of claim 13, where the processing unit is further to:
determine that the received data unit is a test data unit when the received data unit includes an identifier field that identifies the received data unit as a test data unit.

16. The node of claim 12, where the sending node evaluates a status of the node based on the first time value and the second time value.

17. One or more non-transitory memory devices that store instructions, the instructions comprising:

one or more instructions which, when executed by a processor of a sending node, cause the processor to send a test data unit to a receiving node across a network,
the test data unit including an empty payload to indicate that the test data unit is a test data unit;
one or more instructions which, when executed by the processor, cause the processor to receive a response data unit from the receiving node across the network,
the response data unit including a first time value and a second time value, different than the first time value, in a payload of the response data unit,
the first time value indicating a time at which the test data unit was received at the receiving node and the second time value indicating a time at which the receiving node sent the response data unit across the network;
one or more instructions which, when executed by the processor, cause the processor to extract the first time value and the second time value from the payload of the response data unit; and
one or more instructions which, when executed by the processor, cause the processor to evaluate a status of the receiving node based on the extracted first time value and the extracted second time value,
the one or more instructions to evaluate the status of the receiving node based on the extracted first time value and the extracted second time value including:
one or more instructions which, when executed by the processor, cause the processor to conduct a testing session with the receiving node when a third time value, based on an amount of time that elapsed between the extracted first time value and the extracted second time value, corresponds to a first magnitude, and
one or more instructions which, when executed by the processor, cause the processor to terminate the testing session with the receiving node when the third time value corresponds to a second magnitude different than the first magnitude.

18. The one or more non-transitory memory devices of claim 17, where the instructions further comprise:
one or more instructions to include a data unit overhead in an identifier field of the test data unit, where the data unit overhead comprises:
a network address associated with the sending node and a network address associated with the receiving node,
where the test data unit is sent to the receiving node based on the network address associated with the receiving node.

19. The one or more non-transitory memory devices of claim 17, the instructions further comprising:
one or more instructions which, when executed by the processor, cause the processor to send a second test data unit, different than the test data unit, to determine, whether results of previous test sessions are valid or invalid;
one or more instructions which, when executed by the processor, cause the processor to receive a second response data unit, different than the response data unit,
where the second response data unit includes a fourth time value, that indicates an amount of time that elapsed from a time at which the second test data unit was received at the receiving node until a time at which the receiving node sent the second response data unit;
one or more instructions which, when executed by the processor, cause the processor to determine that a result of one of the previous test sessions is invalid when a magnitude of the fourth time value exceeds a third magnitude; and
one or more instructions which, when executed by the processor, cause the processor to determine that a result of the one of the previous test sessions is valid when a magnitude of a fourth time value does not exceed the third magnitude.

* * * * *